United States Patent [19]

Löblich

[11] Patent Number: 4,496,526

[45] Date of Patent: Jan. 29, 1985

[54] PROCESS FOR THE PRODUCTION OF POTASSIUM MAGNESIUM PHOSPHATE

[75] Inventor: Karl-Richard Löblich, Barsinghausen, Fed. Rep. of Germany

[73] Assignee: Kali und Salz AG, Kassel, Fed. Rep. of Germany

[21] Appl. No.: 464,731

[22] Filed: Feb. 7, 1983

[30] Foreign Application Priority Data

Feb. 8, 1982 [DE] Fed. Rep. of Germany ....... 3204238

[51] Int. Cl.$^3$ ............................................. C01B 25/26
[52] U.S. Cl. ....................................... 423/306; 71/33; 71/41
[58] Field of Search ...................... 423/306; 71/33, 34, 71/41

[56] References Cited

U.S. PATENT DOCUMENTS

| | | | |
|---|---|---|---|
| 1,922,283 | 8/1933 | Dering | 23/304 |
| 3,466,161 | 9/1969 | Perlmutter et al. | 71/33 |
| 3,615,186 | 10/1971 | Jahn-Held et al. | 423/306 |
| 4,153,441 | 5/1979 | Guithues et al. | 423/306 |
| 4,217,333 | 8/1980 | Löblich | 423/306 |

FOREIGN PATENT DOCUMENTS

| | | | |
|---|---|---|---|
| 740307 | 4/1970 | Belgium | 423/306 |
| 901261 | 5/1972 | Canada | 423/306 |
| 619397 | 2/1933 | Fed. Rep. of Germany . | |
| 1265726 | 4/1968 | Fed. Rep. of Germany | 423/306 |
| 1924284 | 11/1970 | Fed. Rep. of Germany | 423/306 |
| 2831672 | 7/1978 | Fed. Rep. of Germany . | |
| 3245 | 2/1965 | Japan | 423/306 |

*Primary Examiner*—Gary P. Straub
*Assistant Examiner*—Wayne A. Langel
*Attorney, Agent, or Firm*—Michael J. Striker

[57] ABSTRACT

For the production of potassium magnesium phosphate from phosphoric acid, potassium salts and basic magnesium compounds, these are reacted in a mixture of recycled mother liquor from the potassium magnesium phosphate crystallization and of fresh water, with adjustment of the pH-value of the reaction mixture to 7.2 up to 8.5 through addition of quickly reacting basic compounds, in the presence of potassium magnesium phosphate seed crystals, whereupon the product is separated from the mother liquor and from this a part is recycled to the process start, and the rest is removed.

5 Claims, No Drawings

PROCESS FOR THE PRODUCTION OF POTASSIUM MAGNESIUM PHOSPHATE

BACKGROUND OF THE INVENTION

Processes are already known for the production of potassium magnesium phosphate, according to which potassium dihydrogen phosphate is reacted with magnesium oxide or magnesium carbonate in the amount of water which is bound by the potassium magnesium phosphate as water of crystallization. Likewise, there is described in "Gmelins Handbuch der anorganischen Chemie", 8. Aufl., System-Nr. 27 (B), Lieferung 4 (1939), pp. 465-466, the reaction of Engel's salt ($MgCO_3 \cdot KHCO_3 \cdot 4H_2O$) with phosphoric acid into potassium magnesium hexahydrate.

The subject of DE-OS No. 19 24 284 is also a process for the production of potassium magnesium phosphate, by reaction of magnesium oxide and potassium hydroxide with phosphoric acid.

Since the potassium salt to be employed according to these processes must first be obtained in a required process from potassium chloride, it is already recommended in DE-PS 619 397 to react a mixture of magnesium- or potassium-chloride with phosphoric acid in heat, until hydrogen chloride no longer escapes. However, these processes require apparatus of corrosion-resistant material and particular arrangements for treatment of the exhaust gas.

It is further known to produce potassium magnesium phosphate by reaction of potassium- and magnesium-chloride or -sulfate with phosphoric acid in the presence of organic amines, whereby the amine binds the acid anion liberated during the reaction, under formation of the corresponding amine salt. Such processes are already known from DE-PS No. 12 65 726, U.S. Pat. No. 3,615,186 and BE-PS No. 740 307. The use of amines in these processes has, however, an additional expenditure with regard to the recovery of the amine from the formed salts.

In order to avoid the additional expenditure, which is necessary with the known processes either for the prior obtaining of the suitable potassium compounds from potassium chloride or for the connected working-up of the amine salt, there is suggested in DE-PS No. 28 31 672 a process for the production of potassium magnesium phosphate, according to which in an acid phosphate solution with a $P_2O_5$-content from 20 up to 160 g $P_2O_5$ per 1000 g water, the stoichiometrically necessary amount of basic reacting magnesium compound and a partial amount of the totally required potassium chloride, for the formation of dimagnesium phosphate, are stirred in, and into the produced suspension, after addition of the remaining amount of potassium chloride, whereby the total amount of potassium chloride to be employed is increased to a mol ratio of $K_2O$ to $P_2O_5$ from more than 1:1 up to a little below the saturation concentration, at a temperature of below 40° C., is slowly added the amount of basic reacting magnesium compound stoichiometrically necessary for the formation of the tertiary magnesium phosphate, whereby a concentration of 130 g $MgCl_2$ in 1000 g water cannot be exceeded in the reaction mixture.

For the basic magnesium compound which is to be slowly added around the end of these processes, it is recommended to employ a particularly reaction-active basic magnesium compound, such as for example highly active magnesium oxide or nesquehonite. Since the amount of magnesium to be added in this stage of the previously known processes in the form of the particularly reaction-active basic magnesium compound amounts to about a third of the totally necessary amount for the suggested processes, and the obtaining of such highly active basic magnesium compounds is technically expensive, the problem arises of finding a possibility which would make the employment of highly active magnesium compounds superfluous.

SUMMARY OF THE INVENTION

There has now been discovered a process for the production of potassium magnesium phosphate by reaction of acid, phosphate ion-containing solutions with a potassium salt and basic reacting magnesium compounds, and separation of crystallized potassium magnesium phosphate from the mother liquor. The potassium salt, in an amount greater than the stoichiometric amount, and the stoichiometrically necessary amount of the basic reacting magnesium compound are dispersed in a mixture of recycled mother liquor and of fresh water, to form a dispersion or slurry having 200 g/l and less content of solids, followed by quickly stirring into the dispersion the acid phosphate solution, and after addition of potassium magnesium phosphate seed crystals, the pH-value of the reaction mixture is adjusted to 7.2 up to 8.0 with a basic reacting alkali or earth alkali compound, whereupon the crystallized potassium magnesium phosphate-hexahydrate is separated from the mother liquor as crude salt.

When as potassium salt, potassium sulfate is employed, it is preferred to stir the potassium sulfate, basic magnesium compound and phosphoric acid into the mixture of mother liquor and fresh water in a P:Mg mol ratio of 2:3 and in amounts which are sufficient to adjust the content of the mixture per 1000 parts by weight water, in potassium sulfate to 80 up to 100 parts by weight and the content of magnesium sulfate to at most 150 parts by weight.

An improvement of the content of potassium magnesium phosphate-hexahydrate can be attained according to the process of the present invention by conveying the filter-moist crude salt of potassium magnesium-hexahydrate, with a potassium salt solution, having a concentration amounting to at least 60% of the saturation value, into a stirrable suspension, and at a temperature between 30° and 40° C., stirring for at least 30 minutes, whereupon the potassium magnesium phosphate-hexahydrate is separated from the liquid phase, which as potassium salt and fresh water portion is employed in the obtaining of the potassium magnesium phosphate crude salt. Herewith it can also be advantageous to heat the suspension of crude potassium magnesium phosphate-hexahydrate in the potassium salt solution to a temperature of above 100° C. up to the phase change, to separate the monohydrate at the same temperature from the liquid phase, and without further washing to dry it at a temperature above 100° C.

It is of decisive significance for the process according to the present invention that the reaction mixture, until through the end of the reaction, contain an as great as possible excess of potassium salt, that the concentration of the magnesium salt dissolved in it, which is formed only by the reaction, not exceed determined limiting values, and that its pH-value lie sufficiently high. The concentration conditions are adjusted by the reactants and the freshly added water. The pH-value is indeed also determined from the reactants, when according to the present invention, as basic reacting magnesium compound, not the expensive to produce highly active magnesium oxide, but reaction-yielding magnesium carriers, such as caustic burned magnesite or technical magnesium hydroxide, are employed, the pH-value rising too slowly around the end of the reaction.

Technical magnesium hydroxide is manufactured predominantly by precipitation. This product can be employed in filter-moist condition in the process according to the present invention, whereby drying energy is saved. Very often flocculants are employed with the magnesium hydroxide precipitation, which decreases the reaction-readiness of the hydroxide. In the process according to the present invention this decrease of reaction-readiness can be adjusted with good results, when, following the advance of the reaction, a small amount of highly reactive alkaline substance is added, when the pH-value remains below optimum.

According to the present invention, after the mixing together of reactants and the institution of crystallization, one adds so much of the highly reactive alkaline substance to the reaction mixture, than the optimal pH-value is adjusted.

The optimal pH-value lies above 7.2 in the reaction mixture with chlorides as dissolved salts. It is adjusted through the addition of highly active magnesium oxide. Instead of this highly active magnesium oxide, also alkali hydroxide in solid or dissolved form can be used for the adjustment of the pH-value of the reaction mixture during the crystallization phase.

The process according to the present invention can be performed for the production of potassium magnesium phosphate, not only with potassium chloride but also with potassium sulfate. With use of the chloride as potassium salt, long-needle potassium magnesium phosphate crystals are obtained.

With the use of potassium sulfate in the process according to the present invention, it has surprisingly turned out that the reaction with potassium sulfate leads to potassium magnesium phosphate crystals with a significantly more favorable length-width ratio and a greater mass content than is the case with the chloride. Thereby these crystals can be mechanically de-watered up to a residual moisture between 20 and 35% by weight. The easier separability of the crystals from the mother liquor, their good washability, and the possibility of an extensive mechanical de-watering signify a considerable savings in energy.

With use of potassium sulfate as potassium salt, there adjusts in the reaction mixture a higher pH-value. Since however also the optimal pH-value for the crystallization of the potassium magnesium phosphate-hexahydrate lies higher in solutions with predominant sulfate content, namely above 8.0, the total behavior of the reaction mixture with potassium sulfate remains extensively comparable to that of the reaction mixture with potassium chloride. With use of basic magnesium compounds of only average reactivity, the spontaneous adjustment of the optimal pH-value in the significant crystallization phase is too slow. The reaction and crystallization can then advantageously be substantially accelerated, when the pH-value in the crystallization phase is adjusted to the optimal value through addition of small amounts of highly active magnesium oxide or small amounts of alkali hydroxide as pH-regulators.

The necessary amounts to be added of pH-regulators runs from between 2 and 15% by weight of the total amount of basic reacting magnesium compounds. Savings with regard to the latter are possible in principle according to the additions, but frequently afford no advantage. When no pH-regulators are employed, the product contains a small excess of non-reacted basic magnesium compounds, which can, however, be tolerated for numerous technical uses.

Aside from highly active magnesium oxide or alkali hydroxide, in cases in which the purity requirements of the product can be held lower, at lowest possible values of the given temperature range, also half deacidified dolomite can be employed as pH-regulator. The use of calcium oxide or hydroxide is less recommended, since therewith too great a phosphate portion in the form of non-desirable calcium phosphates occurs.

For the process according to the present invention, preferably an agitator vessel cascade is used as crystallization apparatus, into the first vessel of which is led the reaction mixture which runs off from the pre-reactor. The pre-reactor is composed of one or more vessels, wherein the reactants are dispersed under intensive intermixing into the mixture of water and recycled mother liquor, and the reaction takes place. After leaving the pre-reactor, it has proceeded roughly to the stage of the secondary phosphate.

The first vessel of the at least four-stage cascade is provided with heat exchangers, which allow one to hold the crystallization temperature in the optimal range between 30 and at most 40° C. In the first vessel is instituted the formation of the tertiary phosphate and therewith the crystallization phase. Here, the pH-value is measured. In the second vessel follows the addition of the pH-regulator, for control of the pH-value in the next-following vessel.

The crystallization takes a particularly favorable course, when the pH-value lies in the optimal range and seed material is provided. Expediently, the seed material, dispersed in the mother liquor, is added to the first vessel of the crystallization cascade. The seed material can be withdrawn from the upper course of a flow bowl classifier, which is supplied with the outflow from the last stage of the crystallization cascade, and has the advantage of feeding coarser crystals to the connected de-watering arrangement. The dwell time of the reaction mixture in the crystallization cascade should amount to from 30 to 90 minutes.

The stoichiometry of the reaction partners is so selected with use of potassium chloride in the ratio to fresh 15 water supply, that the mother liquor of the potassium magnesium phosphate crystallization contains at most 130 g $MgCl_2$, preferably 110 g $MgCl_2$, to 1000 g water, with a KCl-content close to saturation. With use of potassium sulfate, it is adjusted to provide at most 150 parts by weight $MgSO_4$, preferably 80–100 parts by weight $MgSO_4$, and from 80 up to 120 parts by weight $K_2SO_4$, per 1000 g of water. Recycled mother liquor is not considered stoichiometrically, since it only serves for reduction of the density of the dispersion or slurry.

The potassium magnesium phosphate-hexahydrate crystallizes almost always with more or less strong mixture of other magnesium phosphates. It has surprisingly turned out that this mixture can be decomposed by stirring the crude crystallate with a sufficient amount of potassium salt solution at a temperature between 30° and 40° C. The liquid phase separated from the enriched product can be considered as a mixture of water, potassium sulfate and mother liquor, and correspondingly be employed in the process for the production of potassium magnesium phosphate-hexahydrate crude salt.

A similar effect is obtained under simultaneous phase change of the hexahydrate into monohydrate, when the crude potassium magnesium phosphate-hexahydrate is suspended in potassium salt solution and heated under pressure to 120° C. In this case the monohydrate must be separated from the liquid phase at highest possible temperature (90°-100° C.) after the relaxation of the suspension, and without cooling down be introduced into a drying oven. Unnecessary cooling down can result in a reformation of hexahydrate. The herewith produced liquid phase can also be employed as potassium salt solution in the production operation of the potassium magnesium phosphate.

In both cases the product does not need to be washed, if the solution used for the wetting or for the stirring is prepared by dissolving potassium sulfate in water.

The advantage of the process according to the present invention when compared to the process suggested in DE-PS No. 28 31 672 is in general that basic reacting magnesium compounds with a relatively low reactivity can be employed, which are provided with substantially lower technical expenditure than highly active magnesium compounds. Since the amount employed of pH-regulators which is to be added according to the present invention is small in comparison to that of the magnesium compounds of lower reactivity, this provides an advantage for the process according to the present invention. The use of potassium sulfate as potassium salt has yet the specific advantage that the potassium magnesium phosphate crystallizes in a form favorable for the mechanical de-watering, whereby a considerable savings in energy is obtained. The stirring of the moist crude crystallizate into the potassium salt solution instead of the washing leads to products which are richer in potassium.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

Without considering the 4.82 m³ mother liquor circulating through recycling, 417 kg technical KCl (with 87% KCl, 5% NaCl and 8% moisture), 479 kg filter-moist magnesium hydroxide (with 49% Mg(OH)₂, 5% non-reactionable impurities and 47% moisture) and 697 kg water are reacted with 439 kg of a technical phosphoric acid (with a P₂O₅-content of 43.5%).

At the start of the crystallization phase, after addition of 240 kg seed material, a pH-value of 6.8 is adjusted. This is raised to a value between 7.2 and 7.5 by addition of finest granulated active magnesium oxide with an iodine number of 75, and held in this range. After the pH-adjustment, the previously strongly hampered crystallization proceeds continuously.

There are separated from the reaction mixture including the seed material, 969 kg technical potassium magnesium phosphate as hexahydrate, which contains 26.1% by weight $P_2O_5$; 14.9% $K_2O$; 17.7% by weight MgO and 37.9% by weight of water of crystallization.

In the mother liquor there have formed 1322 kg or 1124 m³ of the following contents per 1000 g water: 191 g KCl, 21 g NaCl and 110 g MgCl₂. The density of this mother liquor is measured to be H 1.176 g/ml at a temperature of 39° C.

The dispersion density, not counting the recycling of mother liquor, was 589 g product/l running off dispersion. Through recycling of 4.82 m³ into the reaction mixture one produces 6.46 m³ dispersion with 969 kg product, corresponding to a dispersion density of 150 g product/l running off dispersion.

The product is separated from the mother liquor, washed, and after acceptance of the seed material a part is dried and another part is calcined. The product contains:

|  | % $P_2O_5$ | % $K_2O$ | % MgO | % Cl |
| --- | --- | --- | --- | --- |
| dried | 26.1 | 14.9 | 17.7 | 0.5 |
| calcined | 41.4 | 23.7 | 28.1 | 0.8 |

The amount of product corresponds to 729 kg of newly formed hexahydrate. In the mother liquor, 5.94 m³ are separated, of which 4.82 are recycled, and accordingly the new formation (provided) 1.12 m³ are removed. With drying of the product into hexahydrate, 0.72 t $H_2O$/g hexahydrate were to be evaporated.

EXAMPLE 2

292 kg moist technical Mg(OH)₂ (with 49% Mg(OH)₂, 4% non-reactionable compounds, and 47% moisture), together with 260 kg technical potassium sulfate (with 5% MgSO₄ and 2.4% water) are dispersed in 825 ml water. After the addition of 1.0 m³ recycled mother liquor and good intermixing, 272 kg technical phosphoric acid (with 43.5% P₂O₅ and 40% H₂O) are added under strong stirring. The so produced reaction mixture is introduced to the first vessel of the crystallization cascade, in which a temperature of 38° C. is adjusted and maintained. There, 160 kg seed material dispersed in 1.75 m³ mother liquor are added.

In the first vessel of the crystallization cascade there adjusts a pH-value of 7.5. 20 kg of a 50% caustic soda are dosed into the following vessel. In this manner the pH-value during the crystallization of the potassium magnesium phosphate-hexahydrate can be held between 8.0 and 8.5.

4.15 m³ suspension with a density of 150 g product/l suspension run off from the last cascade stage. This corresponds to 622.5 kg product, of which 462.5 kg are newly formed and 160 kg are circulating seed material. The suspension contains approximately 3.8 m³ mother liquor, of which 1.05 m³ have been newly formed. After separation of the product, 2.75 m³ of the mother liquor are recycled in part as seed material carrier, the remainder being exported. The density of the mother liquor is measured to be 1.16 g/ml, at a temperature of 38° C. After the separation and washing, the product has the following composition:

|  | % $P_2O_5$ | % $K_2O$ | % MgO | % $SO_3$ |
| --- | --- | --- | --- | --- |
| dried (hexahydrate) | 25.6 | 16.2 | 15.5 | 2.1 |
| calcined | 41.3 | 26.1 | 25.0 | 3.4 |

The mother liquor has the composition (105 g $K_2SO_4$ + 18 g $Na_2SO_4$ + 92 g $MgSO_4$ + 1000 g $H_2O$)

With drying of the product, 0.30 t $H_2O$/t hexahydrate are to be evaporated.

EXAMPLE 3

189 kg caustic burned magnesite (iodine number 5, 79.1% total content of MgO, 71.1% content of reactive MgO, 29% non-reactive components) are dispersed with 308 kg technical potassium sulfate (50% $K_2O$) in 1024 l water. Together with 362 kg technical phosphoric acid (43.5% $P_2O_5$), 2150 l recycled mother liquor are quickly stirred in.

The reaction mixture is maintained in the first stirring vessel at 39° C., and reacted with 221 kg seed material dispersed in 2210 l mother liquor. The pH-value reaches only 6.8 and is therefore much too low for the potassium magnesium phosphate crystallization from sulfatic mother liquor. Accordingly, through the addition of 20 kg highly active magnesium oxide with an iodine number of about 80 into the second stirring vessel of the cascade, the pH-value of the reaction mixture is adjusted to a value between 8.0 and 8.5 and so maintained.

5.89 m³ suspension with 150 g potassium magnesium phosphate product/l suspension run off from the last stage of the cascade. This value corresponds to 663 kg of newly formed potassium magnesium phosphate as hexahydrate and 221 kg seed material as well as 1.05 m³ of newly formed mother liquor in addition to the 4.36 m³ mother liquor arising from the recycling.

| | Product Composition: | | | |
|---|---|---|---|---|
| | % $P_2O_5$ | % $K_2O$ | % MgO | % $SO_3$ |
| dried (hexahydrate) | 23.7 | 13.4 | 20.7 | 2.6 |
| calcined | 35.3 | 20.0 | 30.9 | 3.9 |
| mother liquor: | (120 g $K_2SO_4$ + 110 g $MgSO_4$ + 1000 g $H_2O$), $D_{39}$ = 1.171 | | | |

EXAMPLE 4

600 kg filter-moist crude hexahydrate from Example 2 are deposited at a temperature of 35° C. into a solution of 90 kg potassium sulfate in 825 l water, and stirred for 60 minutes. Thereafter the crystalline product is separated from the liquid phase. Therewith are produced 835 l liquid phase and 610 kg moist product, which is dried without washing.

There remains after the drying 474 kg potassium magnesium hexahydrate with the following contents:

24.9% $P_2O_5$; 17.7% $K_2O$; 15.4% MgO; and 2.5% $SO_3$.

Through calcining, one obtains therefrom a practically water-free product with 39.5% $P_2O_5$; 28.1% $K_2O$; 24.4% MgO; and 4.0% $SO_3$.

The separated liquid phase has, per 1000 g water, the following contents:

101 g $K_2SO_4$; 3 g $Na_2SO_4$; and 18 g $MgSO_4$.

The 835 l of this liquid phase can be employed in the process according to Example 2 instead of 650 l water, 70 kg potassium sulfate, and 161 l of to be recycled mother liquor. The process employs 825 l fresh water. When the 835 l of the liquid phase are employed, only an additional 175 l fresh water are necessary. Instead of the 260 kg potassium sulfate, still only 190 kg solid need be added at the start, since the stirring solution contains 70 kg.

EXAMPLE 5

600 kg filter-moist crude hexahydrate from Example 2 are placed in a solution of 90 kg potassium sulfate in 825 l hot water and heated for 30 minutes under pressure to 120° C. After pressure reduction, the product is separated hot from the solution. Therewith are obtained 866 l filtrate, which after cooling is usable as potassium sulfate-fresh water-mother liquor mixture in the hexahydrate production.

There were about 600 kg of product obtained, which without cooling are introduced into a drier. The product consists mainly of moist potassium magnesium phosphate-monohydrate. From this, at a temperature of 110° C., 340 kg of product are obtained from the dry material, with 34.7% $P_2O_5$; 26.7% $K_2O$; 21.4% MgO; 5.3% $SO_3$ and 9.4% $H_2O$.

The content of nutrients available for plants is 83% by weight.

It will be understood that each of the elements described above, or two or more together, may also find a useful application in other types of compounds manufacture different from the types described above.

While the invention has been illustrated and described as embodied in a process for the production of potassium magnesium phosphate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. Process for the production of potassium magnesium phosphate through reaction of acid, phosphate ion-containing aqueous solutions with a potassium salt and basic reacting magnesium compounds and separation of crystallized potassium magnesium phosphate from a mother liquor, comprising the sequential steps of dispersing the potassium salt in excess stoichiometric amount and the stoichiometrically necessary amount of basic magnesium compound into a mixture of circulating mother liquor and fresh water to form a dispersion of 200 g/l or less solids content, quickly stirring the acid phosphate solution into the dispersion, adding potassium magnesium phosphate seed crystals to the dispersion, adjusting the pH-value of the reaction mixture to alkaline with a basic reacting alkali or earth alkali compound, and separating crystallized potassium magnesium phosphate hexahydrate as crude salt from the mother liquor.

2. Process according to claim 1, wherein said adjusting of the pH-value is performed to an alkaline range between 7.2 and 8.5.

3. Process according to claim 1, using potassium sulfate as potassium salt in the mixture of mother liquor and fresh water, wherein potassium sulfate, basic magnesium compound and phosphoric acid are stirred into the mixture in a P:Mg mol ratio of about 2:3 and in amounts sufficient to adjust the content of the mixture, per 1000 parts by weight water, to 80 up to 100 parts by weight potassium sulfate and at most 150 parts by weight magnesium sulfate.

4. Process according to claim 1, wherein filter-moist crude salt of potassium magnesium phosphate is converted into a stirrable suspension with a potassium salt solution, said solution having a concentration of at least 60% of the saturation value, said suspension is stirred for at least 30 minutes at a temperature between 30° and 40° C., whereupon the potassium magnesium phosphate-hexahydrate is separated from the liquid phase, which as potassium salt and fresh water portion is employed in the obtaining of the potassium magnesium phosphate crude salt.

5. Process according to claim 4, wherein said suspension of crude potassium magnesium phosphate-hexahydrate in potassium salt solution is heated to a temperature above 100° C. until phase change, the monohydrate is separated at the same temperature from the liquid phase, and without further washing, dried at a temperature above 100° C.

* * * * *